United States Patent [19]
Trepka
[11] 4,145,298
[45] Mar. 20, 1979

[54] HYDROGENATED LITHIATED COPOLYMERS GRAFTED WITH ORGANIC NITROGEN COMPOUNDS AS VISCOSITY INDEX IMPROVERS HAVING DISPERSANT PROPERTIES

[75] Inventor: William J. Trepka, Bartlesville, Okla.
[73] Assignee: Phillips Petroleum Company, Bartlesville, Okla.

[21] Appl. No.: 826,573
[22] Filed: Aug. 22, 1977
[51] Int. Cl.[2] ........................ C10M 1/32; C10M 3/26; C08L 9/00; C08L 147/00
[52] U.S. Cl. ................................ 252/51.5 A; 252/50; 252/51.5 R; 260/879; 260/880 R
[58] Field of Search ............... 252/51.5 A, 50, 51.5 R; 260/879, 880 R

[56] References Cited

U.S. PATENT DOCUMENTS

| | | | |
|---|---|---|---|
| 3,170,903 | 2/1965 | Stearns | 260/94.2 |
| 3,378,492 | 4/1968 | Song et al. | 252/51 |
| 3,419,365 | 12/1968 | Streets | 44/62 |
| 3,492,369 | 1/1970 | Naylor | 260/879 |
| 3,554,911 | 1/1971 | Schiff et al. | 252/59 |
| 3,567,798 | 3/1971 | Haefele et al. | 260/880 |
| 3,600,311 | 8/1971 | Nalman et al. | 252/59 |
| 3,751,384 | 8/1973 | Langer | 252/431 N |
| 3,781,260 | 12/1973 | Halasa | 260/94.7 A |
| 3,923,930 | 12/1975 | Waldbillig | 260/878 R |
| 3,925,511 | 12/1975 | Loveless | 252/51.5 A |
| 3,976,628 | 8/1976 | Halasa et al. | 252/50 |

FOREIGN PATENT DOCUMENTS 441050 7/1969 Australia.

OTHER PUBLICATIONS

Encyclopedia of Polymer Science & Technology, vol. 9, 1968, pp. 842–852, by L. E. Coleman.

*Primary Examiner*—Delbert E. Gantz
*Assistant Examiner*—Irving Vaughn

[57] ABSTRACT

Nitrogen-containing copolymers are prepared by the reaction of lithiated hydrogenated conjugated diene-monovinylarene copolymers with nitrogen-containing organic compounds. The nitrogen-containing copolymers are oil additives which combine the aspects of viscosity index improvers with dispersant properties.

52 Claims, No Drawings

HYDROGENATED LITHIATED COPOLYMERS GRAFTED WITH ORGANIC NITROGEN COMPOUNDS AS VISCOSITY INDEX IMPROVERS HAVING DISPERSANT PROPERTIES

FIELD OF THE INVENTION

The invention relates to novel copolymers. The invention also relates to improved lubricating oils. The invention further relates to lubricating oil additives.

BACKGROUND OF THE INVENTION

Mineral oil stocks are the prime source of lubricants for an almost endless list of applications. Nearly all of the lubricants are formulated with a variety of additives. Lubricant additives generally are defined simply as materials which enhance or impart desirable properties to a mineral-base oil. The high quality of modern lubricants results for the most part from the use of additives.

Lubricating oils and related hydraulic and transmission fluids for present day machinery, and particularly for present day internal-combustion engines and other uses contain a wide variety of additives. The additives usually are classified according to their intended function such as dispersant; oxidation, corrosion and rust inhibitor; viscosity-index (VI) improver; pour-point depressant; and antiwear agents; antifoam agents; and the like.

The advent of high speed automotive engines in particular, coupled with increased engine operating temperatures and increased complexity of antipollution devices associated with such engines, has resulted in substantial increases in additive quantities in automotive lubricating oils to meet a continuing demand for improved properties and results. The quantities of additives employed in some uses have been approaching quantities so large as to affect negatively the primary mission of the lubricating oil: to lubricate. Needed is a single additive which will provide a multiple function to satisfy at least some of the basic requirements of individual additives for lubricating and other oils now presently satisfied by a package of several additives. With such an additive, the quantity of overall additives employed in the lubricating oil potentially could be substantially reduced, permitting a single effective unit quantity to fulfill multiple requirements.

BRIEF SUMMARY OF THE INVENTION

I have discovered a new class of products which are a reaction product of a metalated (lithiated) hydrogenated butadiene-styrene copolymer with a nitrogen-containing organic compound as, in effect, a grafting agent on the copolymer. I have also discovered that these new products are outstanding viscosity index improvers which additionally act as ashless sludge dispersants. Lubricating oils and related fluids containing my additives thus are provided with the benefits of viscosity index improvers and sludge dispersants with a single additive.

DETAILED DESCRIPTION OF THE INVENTION

The copolymers which I have prepared, and which are employed in lubricating and other oil-based applications as additives to base mineral oils, are prepared by copolymerizing at least one hydrocarbon conjugated diene and at least one monovinylarene hydrocarbon, preferably butadiene and styrene, to produce copolymers, and hydrogenating to produce hydrogenated copolymers. The hydrogenated copolymers are lithiated, and the lithiated hydrogenated copolymers are reacted with certain nitrogen-containing organic compound or compounds. The resultant polar hydrogenated copolymers are highly stable, resistant to heat-deterioration, resistant to oxidative degradation, are of a type and molecular weight to have significant viscosity index improving capabilities when incorporated into lubricating oils, have sufficient solubility to be formulated into lubricating oils, possess significant shear stability in that medium, and provide dispersant properties to the oil.

CONJUGATED DIENE/MONOVINYLARENE COPOLYMERS

In my discussions hereinafter for simplicity and convenience I use styrene as a representative as well as the preferred monovinylarene, and butadiene as a representative as well as the preferred conjugated diene. Similarly butadiene/styrene copolymers are discussed as representative of the applicable conjugated diene/-monovinylarene copolymers generally.

Conjugated diene monomers suitable for making copolymers of my invention are those aliphatic hydrocarbon dienes of four to eight carbon atoms per molecule. Exemplary dienes include butadiene, isoprene, 2,3-dimethylbutadiene, piperylene, and the like.

Monovinylarene monomers suitable for use in making copolymers of my invention are the hydrocarbon monovinylarenes of eight to fifteen carbon atoms per molecule. Exemplary monovinylarenes include styrene, 3-methylstyrene, 3,5-diethylstyrene, 4-tolylstyrene, and the like.

Suitable copolymers will contain about 20 to 70 percent by weight copolymerized styrene, the balance then being copolymerized butadiene, more preferably about 50 to 65 weight percent styrene and the balance butadiene. These copolymers presently preferably are substantially random copolymers, but can contain significant blocks of polystyrene and/or blocks of polybutadiene and/or blocks of random or random tapered butadiene/styrene. These copolymers also can be presented by such as B/A, A-B, B/A-A, and wherein A is a block of polystyrene, B is a block of polybutadiene, and B/A represents either a random copolymer block of butadiene/styrene, or a tapered block of butadiene/styrene, with the realization that B/A also can contain appreciable block structure of polystyrene. The use of the designation B/A when used with reference to tapered random blocks indicates the direction of taper with the B/A blocks, while random, gradually decreases in content of the first indicated monomer along the block, due to the mode of preparation used. The block polystyrene A content of the random block copolymer B/A-A preferably should be in the range of about 15 to 35, more preferably 15 to 25, weight percent.

The butadiene/styrene copolymers which are employed to prepare my additives should have a number average molecular weight in the approximate range of 20,000 to 300,000, presently preferred about 25,000 to 100,000. The copolymers, as far as the butadiene portion, will have a vinyl content prior to hydrogenation of about 20 to 95 weight percent, preferably about 20 to 70 weight percent. The copolymers must be of a type and molecular weight to provide significant viscosity index improving properties to the oil when so used, to have sufficient oil-solubility to be formulated into lubricating oils, and to possess significant shear stability in such oil formulations.

The copolymers of butadiene/styrene employable in accordance with my invention can be prepared by any suitable techniques known in the art.

Most typically, a mixture of butadiene and styrene monomers can be polymerized by contacting the monomers with a hydrocarbon monolithium initiator. Any of the hydrocarbon monolithium initiators known in the anionic solution polymerization arts can be employed. Typically these can be represented by RLi wherein R is a hydrocarbon radical and can be aliphatic, cycloaliphatic, or aromatic, containing at least one carbon atom per molecule. The number of carbon atoms and consequently the molecular weight of the hydrocarbon lithium initiator is not limited as far as operability is concerned, though those of up to about 20 carbon atoms are more readily available. Most frequently employed are the aliphatic monolithium types. Exemplary species include such as n-butyllithium, sec-butyllithium, n-decyllithium, phenyllithium, 1-naphthyllithium, p-tolyllithium, cyclohexyllithium, eicosyllithium, and the like. The presently preferred species are sec-butyllithium and n-butyllithium for commercial availability. If an n-alkyllithium initiator is employed, it usually is advisable to include a minimal amount of a polar compound, such as tetrahydrofuran, to increase initiator activity and efficiency. Such a polar compound may also act as a randomizer.

Such hydrocarbyl monolithium initiators are employed in an amount effective for polymerization of the monomer charge employed to the molecular weight desired. Typically, an exemplary amount of such initiator would be in the range of about 0.33 to 5 mhm, millimoles per 100 grams of monomer, presently preferred about 1 to 4 mhm, consistent with obtaining polymers of presently preferred molecular weight ranges.

Polymerization is conducted by contacting the monomer charge with the monolithium initiator in a suitable diluent. Diluents employed for the purpose include any of the paraffinic, cycloparaffinic, or aromatic hydrocarbons known to the art, used alone or in admixture, typically of 4 to 10 carbon atoms per molecule in commercial operations. Exemplary species include such as n-heptane, cyclohexane, n-hexane, benzene, toluene, the xylenes, 2,2,4-trimethylpentane, and the like. Cyclohexane currently is preferred for ease of handling, high solubility of polymer, and availability.

Polymerization can be carried out at any convenient temperature employed in the solution polymerization arts. Suitable and exemplary temperatures lie in the range of from less than about 0° C. to over 200° C., presently preferred about 40° C. to 100° C., since these temperatures are consistent with obtaining the desired copolymers. The pressures employed can be as convenient, though preferably pressures are employed sufficient to maintain monomers and diluent substantially in the liquid phase. The polymerization times can vary widely as may be convenient, and will, of course, be affected by polymerization temperatures chosen. Time preferably should be chosen such that substantially complete conversion of monomers is obtained.

To prepare the A-B copolymeric structure, either styrene or butadiene can be first polymerized and then the other monomer added and polymerized to result in the A-B copolymer.

Alternatively, a mixture of the butadiene and styrene monomers can be copolymerized in desired proportion under randomizing conditions to produce a B/A copolymer. In another mode, a B/A structure can be first prepared by polymerizing a suitable butadiene/styrene admixture to the desired degree of conversion, and this usually will produce a tapered block since butadiene tends to polymerize somewhat faster to start with, and then subsequently additional styrene can be added to form an A block onto the first formed B/A block. Alternatively, and presently preferred, a mixture in a suitable ratio of butadiene and styrene can be copolymerized, under limited randomizing conditions, and this then permits formation of a preferred B/A-A structure since the faster polymerization of the butadiene exhausts the butadiene, and remaining styrene then block homopolymerizes.

Where a substantially random B/A portion is desired, employment of a randomizing agent can be included at the suitable stage in the polymerization, typically selected from ethers, thioethers, and amines, and others as is known in the art, typically such as tetrahydrofuran, or from the alkali metal alkoxides other than of lithium, typically such as potassium t-butoxide or amyloxide.

Randomizing agents suitable for use can be chosen from among the following and similar compounds which can be characterized as moderately active randomizers or strongly active randomizers. Among those compounds that can be generally characterized as moderately active randomizers are tetrahydrofuran and methyl ethyl ether. Randomizers that can be generally characterized as strongly active can be chosen from among 1,2-dimethoxyethane, dimethyl ether, N,N,N',N'-tetramethylethylenediamine, bis(2-methoxyethyl)ether, and 1,2-bis(2-methoxyethoxy)ethane.

In this invention strongly active randomizers are employed within the range of about 0.05 to about 5 parts per hundred monomers, preferably about 0.1 to about 2.5 parts per hundred monomers. In the process of this invention moderately active randomizers are employed within a range of about 1 to about 20 parts by weight per hundred monomers, preferably within the range of about 1.5 to about 15 parts by weight per hundred monomers.

Other randomizers of lesser activity include diethyl ether, di-n-propyl ether, di-n-octyl ether and dioxane. These compounds are less preferred in view of their comparatively low degree of randomizer activity. These less active randomizers are employed within a range of about 5 to about 100, preferably from about 10 to about 30, parts by weight per hundred parts monomers.

As is known in the art, various substances are known to be detrimental to the initiator, including such as carbon dioxide, oxygen, or water, and the like. It thus is preferable that the reactants, apparatus involved, diluents, and the like, be maintained substantially free of such materials.

HYDROGENATION

The hydrogenation procedure employed should be effective so as to substantially reduce olefinic unsaturation, including vinyl unsaturation, while leaving essentially untouched aromatic unsaturation present in the styrene-derived portion of the copolymer.

Hydrogenation can be conveniently conducted directly on the unquenched polymerization reaction admixture from the polymerization procedure described above. Alternatively, where convenient, the copolymerization can be quenched by addition of suitable amounts of a lower alcohol, water, or the like, to effectively kill active polymer-lithium species. The quenched copolymer then can be coagulated and recovered, by means known in the art, such as by steam-stripping. For hydrogenation purposes, suitable copolymers can be dissolved or redissolved in a suitable hydrocarbon solvent, such as from among those described as for polymerization diluents. Hydrogenation is accomplished by treating the suitable butadiene/styrene copolymer dissolved in such a solvent, by means known in the art for this purpose.

Particularly favorable hydrogenation catalysts comprise reaction products of aluminum alkyl compounds with either nickel or cobalt carboxylates or alkoxides. Typical of the aluminum alkyl compounds are such as triisobutylaluminum, triethylaluminum, tri-n-propylaluminum, and the like. Exemplary nickel or cobalt carboxylates or alkoxides include the nickel and cobalt acetates, propionates, benzoates, octoates, and the butoxides, ethoxides, isopropoxides, and the like. Other suitable hydrogen catalysts include reduced nickel-kieselguhr catalyst.

Exemplary hydrogenation conditions include hydrogenation of the copolymer in a hydrocarbon diluent, and hydrogenation can be conducted, if desired, as described, in the polymerization diluent. Exemplary hydrogenation temperatures lie in the range of about 25° C. to 175° C. Pressures can range up to such as about 1,000 psig. Times can range from a few minutes such as about 30 minutes to several hours such as 4 hours or more, influenced not only by the temperature and pressure chosen, but also by the concentration of the copolymer in the diluent, since this affects the viscosity of the copolymeric solution being treated.

By effective selective hydrogenation, wherein substantially complete reduction of olefinic double bonds is obtained, the reduction of at least about 95 weight percent or more of the olefinic groups will have been obtained, and about 5 percent or less of the phenyl groups will have been hydrogenated.

Following completion of the copolymer hydrogenation step, the hydrogenation catalyst must be deactivated and removed to avoid interference in the succeeding lithiation steps. Conveniently, the total hydrogenation reaction mixture can be treated to deactivate the residual catalyst by any means known in the art. A typical procedure includes the addition of a solution of such as phosphoric acid and ammonium phosphate in such as about a 1:4 weight ratio, followed by introduction of air to convert the catalyst metals to insoluble phosphates, and removal thereof by filtration. The hydrogenated copolymer can be recovered by known methods, such as alcohol coagulation or steam stripping, dried under reduced pressure, followed by redissolving in an inert diluent, such as those described for the polymerization solvent, for the subsequent metalation and grafting procedures. Alternatively, the polymer cement, i.e., the hydrogenated copolymer still dissolved in the diluent employed, after removal of the insoluble catalyst phosphates by filtration, can be dried by conventional means and the metalation and grafting steps then conducted on the dried, i.e., water free, polymer-cement, the entire process from polymerization through grafting thus being readily adaptable to continuous operation.

Alternatively, a suitable hydrogenated copolymer of hereinbefore described characteristics can be dissolved in a suitable hydrocarbon diluent for the metalation and grafting steps in accordance with my invention.

METALATION

The hydrogenated butadiene-styrene copolymer is metalated using an organolithium composition in conjunction with a polar compound in order to introduce lithium atoms along the hydrogenated copolymeric structure.

The metalation is carried out by means of a complex formed by the combination of a lithium component which can be represented by $R'(Li)_x$ with a polar metalation promoter. The polar compound and the lithium component can be added separately or can be premixed or pre-reacted to form an adduct prior to addition to the solution of the hydrogenated copolymer. In the compounds represented by $R'(Li)_x$, the R' is usually a saturated hydrocarbon radical of any length whatsoever, but ordinarily containing up to 20 carbon atoms, and can be an aromatic radical such as phenyl, naphthyl, tolyl, 2-methylnaphthyl, etc., or a saturated cyclic hydrocarbon radical of e.g., 5 to 7 carbon atoms, a monounsaturated cyclic hydrocarbon radical of e.g. 5 to 7 carbon atoms, an unconjugated, unsaturated aliphatic hydrocarbon radical of 1 to 20 carbon atoms, or an alkyllithium having one or more aromatic groups on the alkyl group, the alkyl group containing 1 to 20 carbon atoms. In the formula, $R'(Li)_x x$ is an integer of 1 to 3. Representative species include, for example: methyllithium, isopropyllithium, sec-butyllithium, n-butyllithium, t-butyllithium, n-dodecyllithium, phenyllithium, alpha- and beta-naphthyllithium, any biphenyllithium, styryllithium, benzyllithium, indenyllithium, 1-lithio-3-butene, 1-lithiocyclohexene-3, 1-lithiocyclohexene-2, 1,4-dilithiobutane, 1,4-dilithiobenzene, 1,3,5-trilithiopentane, 1,3,5-trilithiobenzene, and the like.

Lithium adducts of polynuclear aromatic hydrocarbons, such as those described in U.S. Pat. No. 3,170,903, also can be employed, for example, lithium adducts of biphenyl, naphthalene, anthracene or stilbene. Lithium compounds alone usually metalate copolymers containing aromatic and olefinic functional groups with considerable difficulty and under high temperatures which may tend to degrade the copolymer. However, in the presence of tertiary diamines and bridgehead monoamines, metalation proceeds rapidly and smoothly. Some lithium compounds can be used alone effectively, notably the menthyllithium types.

Theoretically, and I do not wish to be bound by theory, it is presently believed likely that the metalation occurs at a carbon to which an aromatic group is attached, or in an aromatic group, or in the event that the polymer is not completely hydrogenated, in positions allylic to residual double bonds, or in more than one of these positions. In any event, it is believed that a very large number of lithium atoms are positioned variously along the polymer chain, attached to internal carbon atoms away from the polymer terminal carbon atoms, either along the backbone of the polymer or on groups pendant therefrom, or both, in a manner depending upon the distribution of reactive or lithiatable positions. This distinguishes the lithiated copolymer from simple terminally reactive polymers prepared by using a lithium or even a polylithium initiator in polymerization, thus limiting the number and the location of the positions available for subsequent attachment. With the metalation procedure described herein, the extent of the lithiation will depend upon the amount of metalating agent used and/or the groups available for metalation.

The polar compound promoters include a variety of tertiary amines, bridgehead amines, ethers, and metal alkoxides.

The tertiary amines useful in the metalation step have three saturated aliphatic hydrocarbon groups attached to each nitrogen and include, for example:

(A) Chelating tertiary diamines, preferably those of the formula $(R^2)_2N\text{-}C_yH_{2y}\text{—}N(R^2)_2$ in which each $R^2$ can be the same or different straight- or branched-chain alkyl group of any chain length containing up to 20 carbon atoms or more all of which are included herein, and y can be any whole number from 2 to 10, and particularly the ethylene diamines in which all alkyl substituents are the same. These include, for example: tetramethylethylenediamine, tetraethylethylenediamine, tetradecylethylenediamine, tetraoctylhexylenediamine, tetra-(mixed alkyl) ethylene diamines, and the like.

(B) Cyclic diamines can be used, such as, for example, the N,N,N',N'-tetraalkyl 1,2-diamino cyclohexanes, the N,N,N',N'-tetraalkyl 1,4-diamino cyclohexanes, N,N'-dimethylpiperazine, and the like.

(C) The useful bridgehead diamines include, for example, sparteine, triethylenediamine, and the like.

Tertiary monoamines such as triethylamine are generally not as effective in the lithiation reaction. However, bridgehead monoamines such as 1-azabicyclo-[2.2.2] octane and its substituted homologs are effective.

Ethers and the alkali metal alkoxides are presently less preferred than the chelating amines as activators for the metalation reaction due to somewhat lower levels of incorporation of nitrogen-containing compounds onto the copolymer backbone in the subsequent grafting reaction.

The milliequivalents of lithium employed for the desired amount of lithiation generally range from such as about 5 to 95, presently preferably about 10 to 20 per hundred grams of copolymer to be modified. Generally equimolar amounts of the polar promoter and the lithium component (based on the carbon-bound lithium) will be employed. The molar ratio of active lithium to the polar promoter can vary from such as 0.01 to 1.5. There appears to be little advantage, however, in using a molar ratio above about 1:1.

In general, it is most desirable to carry out the lithiation reaction in an inert solvent such as saturated hydrocarbons. Aromatic solvents such as benzene are lithiatable and may interfere with the desired lithiation of the hydrogenated copolymer. The solvent/copolymer weight ratio which is convenient generally is in the range of about 5:1 to 20:1. Solvents such as chlorinated hydrocarbons, ketones, and alcohols, should not be used because they destroy the lithiating compound.

The process of lithiation can be carried out at temperatures in the range of such as about −70° C. to +150° C., presently preferably in the range of about 0° C. to 100° C., the upper temperatures being limited by the thermal stability of the lithium compounds. The lower temperatures are limited by considerations of production rate, the rate of reaction becoming unreasonably slow at low temperatures. The length of time necessary to complete the lithiation and subsequent reactions is largely dependent upon the temperature. Generally the time can range from a few minutes to about 24 hours, presently preferably from about 30 minutes to 3 hours.

The extent of lithiation desired depends on the nature of the grafted product desired. A weight percent nitrogen of from about 0.01 to 5, preferably from 0.05 to 0.5, is suitable for providing dispersancy to the butadiene-styrene copolymers which are suitable as VI improvers of my invention. The amount of lithiation required depends on the molecular weight of the backbone polymer, the molecular weight of the nitrogen-containing compound utilized in the grafting reaction, and the weight percent nitrogen desired in the product polymer of my invention.

GRAFTING STEP

The next step in the process of preparing my novel grafted butadiene-styrene copolymers is the treatment of the lithiated hydrogenated copolymers, in solution, and without quenching in any manner to destroy the lithium sites, with a suitable nitrogen-containing organic compound. These nitrogen-containing organic compounds are those suitable for reacting with the metalated butadiene-styrene copolymers in order to provide dispersant as well as viscosity index improving properties to the final grafted nitrogen-containing copolymeric product.

The nitrogen-containing organic compounds suitable for use in this step in accordance with my invention is production of my novel and useful copolymers can be described by the general formulae $X\text{—}Q\text{—}(NR_2^3)_n$ or $Y[Q\text{—}(NR_2^3)_n]_m$ wherein each $R^3$ is the same or different alkyl, cycloalkyl, or aryl radicals, or combination thereof; and Q is a hydrocarbon radical having a valence of n+1 and is a saturated aliphatic, saturated cycloaliphatic, or aromatic radical, or combination thereof. X is a functional group capable of reacting on a one-to-one basis with one equivalent of polymer lithium. Nonlimiting examples of X include such as $$R^4\text{—}\overset{O}{\overset{\|}{C}}\text{—}$$

wherein $R^4$ is hydrogen, or an alkyl, cycloalkyl, or aryl radical or combination radical; $N{\equiv}C\text{—}$; $R^3N{\equiv}HC\text{—}$;

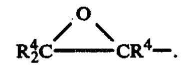

Y is or contains a functional group capable of reacting on a one-to-one basis with one equivalent of polymer lithium, such as a keto group or other similar group derived from or containing functional groups defined as X above. The n can be one or greater with the proviso that the value of n should preferably not exceed that which causes the nitrogen compound or the resulting modified polymer to be hydrocarbon insoluble; and m is 2 or 3. There is no known limit on the number of carbon atoms of any of $R^3$ or $R^4$ as far as operability is concerned. Nonlimiting examples of suitable nitrogen compounds include:

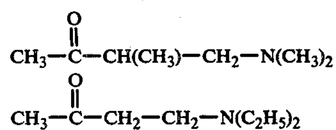

-continued

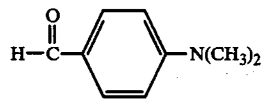

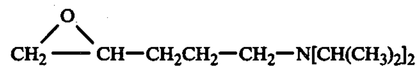

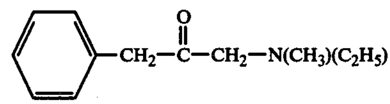

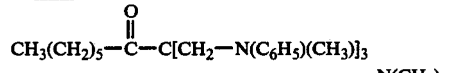

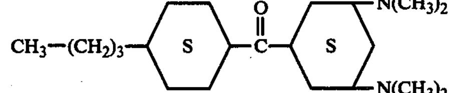

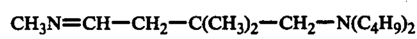

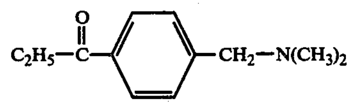

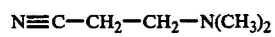

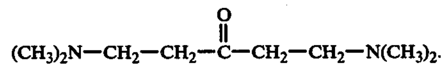

The grafting step is carried out under any suitable conditions to provide my modified copolymer having the desired nitrogen content, which I term a grafted hydrogenated copolymer. Generally, the grafting is done at an effective temperature in the range of such as about 0° C. to 100° C., for an effective time of such as about 0.01 to 10 hours, preferably using at least about one mole of suitable nitrogen-containing compound for each equivalent of copolymer lithium to insure substantially complete reaction of and utilization of the lithium. The grafting step is carried out immediately following the metalation step without prior separation or purification steps so as to preserve the lithium sites.

The modified polymer is recovered using any convenient means such as by coagulation treatment with a lower alcohol followed by filtration and any desired purification steps.

OIL COMPOSITIONS

The nitrogen-containing copolymeric compositions in accordance with my invention can be incorporated as needed into oils including lubricating and other oils using any suitable procedures.

In the preparation of lubricating compositions, various mineral oils are employed. Generally, these are of petroleum origin and are complex mixtures of many hydrocarbon compounds, though they can be derived from coal conversion, tar sands, shale oil, and the like. Preferably, the mineral oils are refined products such as are obtained by well-known refining processes, such as by hydrogenation, by polymerization, by dewaxing, etc. Frequently, the oils have a Saybolt viscosity at 100° F. in the range of about 60 to 5,000, and a Saybolt viscosity at 210° F. of about 30 to 250. The oils can be of paraffinic, naphthenic, or aromatic types, as well as mixtures of two or more types. However, the additives of my invention have special advantages when employed with paraffinic types of oils such as are obtained by solvent extraction of a suitable refinery stream. Many suitable lubricating compositions are available as commercial products, such as those used as motor oils, gear oils, automatic transmission oils, and the like.

In addition to the additives of this invention, the lubricating compositions can comprise one or more of other additives known to those skilled in the art, such as antioxidants, pour-point depressants, dyes, detergents, etc. Examples of these additives are the metal petroleum sulfonates, zinc dialkyldithiophosphates, alkyl succinimides, and the like. To be of commercial interest as a motor oil, the lubricating composition generally preferably presently should have a viscosity index of at least about 130.

My unique nitrogen-containing compolymers find application in use in lubricating oils, automatic transmission fluids, tractor hydraulic fluids, industrial hydraulic oils, aviation oils, and the like, in any broad effective range. A suggested broad amount is in the range of such as about 0.5 to 10 volume percent. For most usages, the presently preferred range is about 0.5 to 5 volume percent in motor oils, and similarly in industrial hydraulic fluids. Typical usages anticipated in specific applications are about 3 to 5, preferably about 3.75, volume percent in automotive transmission fluids, about 1 to 3, preferably about 2, volume percent in industrial hydraulic fluids, about 1 to 3, preferably about 1.3, volume percent in tractor hydraulic fluids, about 8 to 9 volume percent in aviation oils, and about 1 to 3, preferably about 2, volume percent in motor oils.

EXAMPLES

Examples are provided designed to further an understanding of my invention, without limiting the scope thereof. Particular species employed, particular conditions, amounts and materials, ranges and materials, and the like, employed in these examples, are designed to be exemplary, and are directed to one skilled in the art, and are not intended to be limitative of the reasonable scope of my invention.

EXAMPLE I

This example illustrates the use of 4-dimethylamino-3-methyl-2-butanone in preparing a VI improver having dispersant properties.

A 41/59 hydrogenated butadiene-styrene block copolymer having a block styrene content of about 20 weight percent and having properties as shown in Table I was metalated and reacted with 4-dimethylamino-3-methyl-2-butanone according to the following recipe and conditions:

Recipe I

| | |
|---|---|
| Step 1 | |
| Hydrogenated butadiene-styrene copolymer, parts by weight | 100 |
| Cyclohexane, parts by weight | 1520 |
| n-Butyllithium, mhp[(a)] | 12 |
| Tetramethylethylenediamine, mhp | 12 |
| Temperature, ° C. | 70 |
| Time, hours | 1.5 |
| Step 2 | |
| 4-Dimethylamino-3-methyl-2-butanone, mhp | 24 |
| Temperature, ° C. | 22 |
| Time, minutes | 1 |

[(a)] mhp = millimoles per 100 grams of polymer.

Metalation and grafting were carried out employing essentially anhydrous reagents and conditions under an inert nitrogen atmosphere. The hydrogenated butadiene-styrene copolymer was dissolved in cyclohexane and the resulting polymer-cement given a five-minute nitrogen purge to assure absence of dissolved oxygen. After addition of n-butyllithium and tetramethylethylenediamine, the solution was tumbled in a constant temperature bath at 70° C. for 1.5 hours. After cooling to about room temperature, 4-dimethylamino-3-methyl-2-butanone was added, and the mixture then shaken vigorously whereupon the red-orange color of the mixture discharged immediately. The resulting mixture was coagulated in isopropyl alcohol, filtered, and purified by three successive dissolutions in cyclohexane and coagulations in isopropyl alcohol. The modified polymer was dried for about 15 hours at 60° C. under reduced pressure.

Properties of the modified polymer and the starting, unmodified polymer are given in Table I.

Table I

| | 4-Dimethylamino-3-methyl-2-butanone Modified Polymer | Unmodified Polymer |
|---|---|---|
| $M_n$, Molecular weight[(a)] | 43,000 | 58,000 |
| Heterogeneity index[(b)] | 1.32 | 1.25 |
| Inherent viscosity[(c)] | 0.80 | 0.80 |
| Nitrogen, weight percent[(d)] | 0.087 | None |

[(a)]Molecular weights were determined from gel permeation chromatography curves by a procedure described by G. Kraus and C. J. Stacy, J. Poly. Sci: Symposium 43, 329–343 (1973).
[(b)]Quotient of the weight average molecular weight ($M_w$) divided by the number average molecular weight ($M_n$).
[(c)]Inherent viscosity was determined according to the procedure given in U.S. PAT. No. 3,278,508, column 20, Note a with the modification that the solution was not filtered through a sulfur absorption tube but rather a sample of the solution was filtered through a fritted glass filter stick of grade C porosity and pressured directly into the viscometer.
[(d)]Determined using the Dohrmann Micro Coulometric Method.

Viscosity index, pour-point, and sonic shear, as shown in Table II, were determined on oil solutions of polymer blended to 74±2 SUS viscosity at 210° F. (99° C.) using a premium motor oil as shown in Formulation I:

Formulation I

| | |
|---|---|
| Mid-Continent SAE 10 stock | 66.76 |
| Mid-Continent SAE 20 stock | 19.89 |
| Phil-Ad 100[(a)] | 8.15 |
| Lubrizol 934[(b)] | 4.07 |
| Lubrizol 1395[(c)] | 0.73 |
| Paraflow 46[(d)] | 0.40 |

[(a)]A commercially available overbased calcium petroleum sulfonate.
[(b)]A commericially available alkyl succinic ester.
[(c)]A commericially available zinc dialkyldithiophosphate.
[(d)]A commericially available pour depressant-flow improver.

Table II

| | 4-Dimethylamino-3-methyl-2-butanone Modified Polymer | Unmodified Polymer |
|---|---|---|
| Concentration, weight percent[(a)] | 2.2 | 2.0 |
| Viscosity index[(b)] | 159 | 151 |
| Pour point, ° F. [(c)] | −40 | −30 |
| Sonic shear, SUS viscosity loss[(d)] | 0.6 | 0.2 |

[(a)]As required to give 74±2 SUS viscosity at 210° F. in motor oil Formulation I.
[(b)]ASTM D2270-75.
[(c)]ASTM D97-66.
[(d)]The SUS viscosity at 210° F. (100° C.) of a 2.0 weight percent solution of polymer in a base oil is determined before and after irradiator for 6.5 minutes at 100° F. (38° C.) jacket temperature in a Ratheon Model DF-101 sonic oscillator operated at 10 kilocycles per second. The SUS viscosity is determined according to ASTM D455-74.

These data illustrate that modification of the copolymer does not appreciably alter the viscosity index, the pour-point, or the sonic shear of oil formulations containing my copolymers.

EXAMPLE II

This run illustrates the effectiveness of my modified copolymer as a multiple purpose additive, both as a VI improver and as an ashless detergent.

A laboratory, bench-scale test, referred to as the "Carbon Spot Test", and as generally described in U.S. Pat. No. 3,401,117, was used as a preliminary test for dispersancy. This test entails stirring 50 milligrams of carbon black into 10 grams of SAE 10 lubricating oil base stock containing 4 percent of the additive to be tested. A drop of the resulting slurry is dropped onto a polished, stainless steel block heated to 500° F. (260° C). The extent to which the carbon black is carried to the extremity of the resulting oil ring is a measure of the dispersancy of the additive. An arbitrary scale of 1 to 6 designating very poor to excellent is used for rating. Carbon black in oil without other additives is given a 1 rating, while oil containing the commercial dispersant, Lubrizol 925, a commercially available alkyl succinimide, has a 6 rating. Using this test, the oil containing my 4-dimethylamino-3-methyl-2-butanone modified polymer was given a 5+ rating, whereas the oil containing unmodified polymer was rated 2. This run illustrates the marked improvement in dispersancy of the VI improver as a result of grafting the dimethylamino compound onto the polymer backbone.

My modified copolymer was further evaluated for dispersant properties in a Sequence V-C low temperature sludge and varnish engine test as described in ASTM Special Technical Publication 315F. My modified copolymer was blended into a premium motor oil formulation as a replacement for both the typical VI improver and the ashless sludge dispersant. Comparative oil formulations were also evaluated containing the typical VI improver but in which the ashless sludge dispersant was omitted, and a second comparative oil formulation which contained the entire normal additive package, i.e., typical VI improver and dispersant plus other additives. The formulations tested were as follows:

Formulation II

| | Volume Percent | | |
|---|---|---|---|
| | Invention Composition | Commercial Formulation Without Dispersant | Full Commercial Formulation |
| Mid-Continent SAE 10 stock | 69.13 | 69.22 | 64.96 |
| Mid-Continent SAE 20 stock | 20.00 | 20.00 | 20.00 |
| Phil-Ad 100 | 7.00 | 7.00 | 7.00 |
| Lubrizol 1395 | 1.22 | 1.22 | 1.22 |
| Exxon ECA 5118[(a)] | 0.60 | 0.60 | 0.60 |
| Lubrizol 934 | — | — | 4.10 |
| Modified Polymer | 2.05 | — | — |
| Phil-Ad VII ®[(b)] | —1.96 | 2.12 | |

[(a)]A commercially available pour depressant.
[(b)]A commercially available hydrogenated butadiene-styrene copolymer VI improver.

Results from the Ford Sequence V-C Test are given in Table III:

Table III

| | Invention Composition | Commercial Formulation Without Dispersant | Full Commercial Formulation |
|---|---|---|---|
| Average Engine Sludge (10=clean) | 9.2 | 6.6 | 9.4 |
| Average Piston Skirt Varnish (10=clean) | 8.0 | 6.4 | 7.4 |
| Average Engine Varnish (10=clean) | 8.4 | 6.9 | 7.5 |
| Oil Screen Clogging, % | 0 | 10 | 0 |
| Oil Ring Clogging, % | 0 | 0 | 0 |
| Number of Stuck Compression Rings | None | None | None |

These data illustrate that my 4-dimethylamino-3-methyl-2-butanone modified copolymer provides dispersancy equivalent or better than that provided by the commercial Lubrizol 934 dispersant.

EXAMPLE III

This run illustrates the use of p-dimethylaminobenzaldehyde in preparing a VI improver having dispersant properties in accordance with my invention.

A hydrogenated butadiene-styrene copolymer was modified according to my invention employing the procedure given in Example I with the exception that 13 mhp p-dimethylaminobenzaldehyde was used in place of 24 mhp 4-dimethylamino-3-methyl-2-butanone. Properties of the p-dimethylaminobenzaldehyde modified polymer are given in Table IV:

Table IV

| | p-Dimethylamino-benzaldehyde Modified Polymer | Unmodified Polymer |
|---|---|---|
| $M_n$, Molecular Weight | 59,000 | 58,000 |
| Heterogeneity Index | 1.38 | 1.25 |
| Inherent Viscosity | 0.83 | 0.80 |
| Nitrogen, weight percent | 0.13 | 0 |

Using the procedure and Formulation I from Example I, the viscosity index, pour-point, and sonic shear were determined for my p-dimethylaminobenzaldehyde modified polymer. Results are given in Table V:

Table V

| | p-Dimethylamino-benzaldehyde Modified Polymer | Unmodified Polymer |
|---|---|---|
| Concentration, weight percent [a] | 1.75 | 2.0 |
| Viscosity index | 167 | 151 |
| Pour point, ° F. | −35 | −30 |
| Sonic shear, SUS viscosity loss | 0.1 | 0.2 |

[a] As required to give 74±2 SUS viscosity at 210° F. (99° C.) in motor oil Formulation I.

These data show that modification of the copolymer did not adversely affect its performance as a viscosity index improver. A Carbon Spot Test rating of 5 confirmed its very good dispersant properties.

EXAMPLE IV

This run illustrates the use of 3-dimethylaminopropionitrile in preparing a VI improver having dispersant properties in accordance with my invention.

A hydrogenated butadiene-styrene copolymer was modified according to my invention employing the procedure given in Example I with the exception that 24 mhp 3-dimethylaminopropionitrile was used in place of the 4-dimethylamino-3-methyl-2-butanone to prepare a modified copolymer of my invention. Properties of the 3-dimethylaminopropionitrile modified copolymer are given in Table VI:

Table VI

| | 3-Dimethylamino-propionitrile Modified Polymer | Unmodified Polymer |
|---|---|---|
| $M_n$, Molecular Weight | 39,000 | 58,000 |
| Heterogeneity Index | 1.50 | 1.25 |
| Inherent Viscosity | 0.85 | 0.80 |
| Nitrogen, weight percent | 0.081 | 0 |

Using the procedure and Formulation I from Example I, the viscosity index, pour-point, and sonic shear were determined for my 3-dimethylaminopropionitrile modified copolymer. Results are given in Table VII:

Table VII

| | 3-Dimethylamino-propionitrile Modified Polymer | Unmodified Polymer |
|---|---|---|
| Concentration, weight percent [a] | 1.92 | 2.0 |
| Viscosity index | 170 | 151 |
| Pour point, ° F. | −40 | −30 |
| Sonic shear, SUS viscosity loss | 1.6 | 0.2 |

[a] As required to give 74±2 SUS viscosity at 210° F. in motor oil Formulation I.

These data show that modification of the copolymer did not adversely affect its performance as a viscosity index improver. A Carbon Spot Test rating of 4 confirmed its effective dispersant properties.

EXAMPLE V

This run illustrates the use of 4-dimethylamino-2-butanone in preparing a VI improver having dispersant properties in accordance with my invention.

A hydrogenated butadiene-styrene copolymer was modified according to my invention employing the procedure given in Example I with the exception that 12 mhp 4-diethylamino-2-butanone was used in place of 4-dimethylamino-3-methyl-2-butanone, and 1000 parts of cyclohexane was used instead of 1520 parts. The nitrogen content of the resulting modified polymer was 0.13 weight percent. As with my modified copolymers of the earlier examples, modification did not adversely affect the performance of the VI improver. A Carbon Spot Test rating of 5+ illustrated and confirmed the excellent dispersant properties of my modified copolymer.

EXAMPLE VI

A series of runs was made to determine the influence of the 4-dimethylamino-3-methyl-2-butanone:n-butyllithium molar ratio on the weight percent nitrogen incorporated by the grafting process into the butadiene-styrene copolymer. The procedure and recipe as described in Example I were used in these runs with the exception that 1000 parts of cyclohexane was used instead of 1520 parts. n-Butyllithium was used at a level of 12 mhp in all runs, while the 4-dimethylamino-3-methyl-2-butanone level varied over the range corresponding to a 4-dimethylamino-3-methyl-2-butanone:n-butyllithium molar ratio of 0.8:1 to 2:1. The weight percent nitrogen incorporated into the copolymer was essentially constant at 0.08±0.01 weight percent over the tested molar ratio range.

EXAMPLE VII

A series of runs was made to determine the influence of the level of cyclohexane diluent used during the metalation step on processability and the weight percent nitrogen incorporated into the modified copolymer. The procedure and recipe as described in Example I were followed in these runs with the exception that the cyclohexane level was varied from 800 to 1500 parts per hundred parts of polymer. At 800 parts of cyclohexane the solution of lithiated polymer was very viscous with the result that reaction with the 4-dimethylamino-3-methyl-2-butanone was somewhat slower as evidenced by the slower rate of color loss from the solution of the lithiated hydrogenated copolymer compared to solutions prepared using at least 1000 parts of cyclohexane. There did not appear to be any correlation between the amount of nitrogen incorporated into the polymer and the quantity of cyclohexane diluent employed.

EXAMPLE VIII

This run illustrates the use of 1,4-diazobicyclo [2.2.2] octane (DABCO) as the polar compound lithiation activator in the metalation step.

The general procedure and recipe of Example I were modified by using varying levels of DABCO in place of the tetramethylethylenediamine, and allowing the metalation reaction to proceed for 1.5 or 24 hours. Table VIII shows the influence of DABCO level and the influence of time on the weight percent nitrogen incorporated into the polymer upon grafting with 4-dimethylamino-3-methyl-2-butanone and the resulting dispersancy in oil of the resulting modified copolymers.

Table VIII

| DABCO, mhp | Metalation Time, hours | Incorporated Nitrogen, Weight Percent | Dispersancy, Carbon Spot Test Rating |
|---|---|---|---|
| 12 | 1.5 | 0.004 | 2+ |
| 24 | 1.5 | 0.01 | 3 |
| 42 | 1.5 | 0.01 | 3+ |
| 42 | 24 | 0.07 | 5 |

These data illustrate that DABCO can be used as the metalation activator, but that a higher level or a longer reaction time, or both, are required to obtain as high a nitrogen concentration with concurrent excellent dispersancy as is obtained with tetramethylethylenediamine.

The disclosure, including data, illustrate the value and effectiveness of my invention. The examples, the knowledge and background of the field of the invention and general principles of chemistry and other applicable sciences have formed the basis from which the broad descriptions of the invention including the ranges of conditions and generic groups of operant components have been developed, which have formed the basis for my claims here appended.

I claim:

1. Shear-stable, mineral oil-based compositions comprising a major amount of a mineral base oil, and a minor effective viscosity improving amount of an oil-soluble organonitrogen compound grafted hydrogenated conjugated diene/monovinylarene copolymer dissolved therein, said copolymer having a polymerized monovinylarene content of about 20 to 70 weight percent with the proviso that when said copolymer contains a random block, the block polymonovinylarene content is in the range of about 15 to 35 weight percent, a number average molecular weight suitable for oil solubility, the extent of hydrogenation of said copolymer such that about at least 95 weight percent of olefinic double bonds having been saturated and less than about 5 weight percent of aromatic double bonds having been saturated, said copolymer characterized as having been prepared by the process which comprises metalating a hydrogenated conjugated diene hydrocarbon/monovinylarene hydrocarbon copolymer, and reacting the resulting metalated hydrogenated copolymer with effective amounts of at least one nitrogen-containing organic compound represented by the general formulae $X—Q—(NR^3_2)_n$ or $Y[Q—(NR^3_2)_n]_m$ wherein each $R^3$ is the same or different alkyl, cycloalkyl, aryl, or combination radical, Q is a hydrocarbon radical having a valence of n+1 and is a saturated aliphatic, saturated cycloaliphatic, aromatic or combination radical, X is a functional group capable of reaction on a one-to-one basis with one equivalent of polymer metal, Y is or contains a functional group capable of reacting on a one-to-one basis with one equivalent of polymer metal, n is at least one, and m is 2 or 3, thereby preparing said grafted copolymer.

2. The composition of claim 1 wherein X is selected from

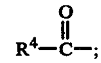

$N≡C—$; $R^3N═HC—$; and

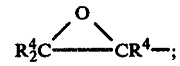

wherein each $R^4$ is the same or different and is hydrogen, alkyl, cycloalkyl, aryl, or combination radical, and Y is or contains an X group.

3. A composition according to claim 1 wherein the nitrogen-containing grafted copolymer has a number average molecular weight in the range of about 20,000 to 300,000, a vinyl content prior to hydrogenation of about 20 to 95 weight percent, and a nitrogen content of about 0.01 to 5 weight percent.

4. A composition according to claim 3 wherein said grafted copolymer has a number average molecular weight in the range of about 25,000 to 100,000, and a vinyl content prior to hydrogenation of about 20 to 70 weight percent.

5. A composition according to claim 4 wherein the mineral oil is a lubricating oil and has a viscosity at 210° F. in the range of about 30 to 250 SUS, and said organonitrogen compound grafted hydrogenated copolymer exhibits a nitrogen content in the range of about 0.05 to 0.5 weight percent.

6. A composition according to claim 5 wherein said grafted copolymer is employed in an amount in the range of about 0.5 to 10 volume percent relative to the total oil excluding other additives.

7. A composition according to claim 6 wherein said nitrogen-containing compound is selected from the group consisting of

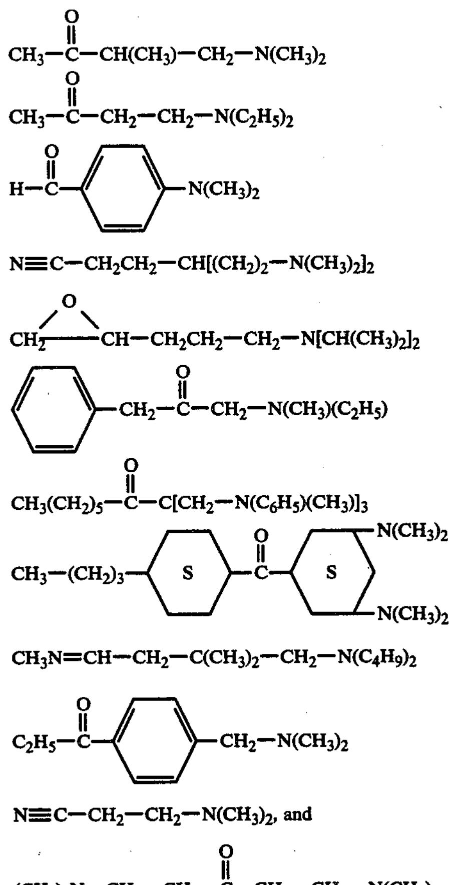

8. A composition according to claim 7 wherein said copolymer is a copolymer of butadiene and styrene, isoprene and styrene, butadiene and α-methylstyrene, or isoprene and α-methylstyrene.

9. The composition according to claim 8 wherein said hydrogenated copolymer is a 41/59 weight percent hydrogenated butadiene/styrene block copolymer having a block styrene content of about 20 weight percent, and said nitrogen-containing compound is 4-dimethylamino-3-methyl-2-butanone.

10. The composition according to claim 8 wherein said nitrogen-containing compound is 4-dimethylamino-3-methyl-2-butanone.

11. The composition according to claim 8 wherein said nitrogen-containing compound is p-dimethylaminobenzaldehyde.

12. The composition according to claim 8 wherein said nitrogen-containing compound is 3-dimethylaminoproprionitrile.

13. The composition according to claim 8 wherein said nitrogen-containing compound is 4-diethylamino-2-butanone.

14. The composition according to claim 8 wherein said nitrogen-containing compound is $N{\equiv}C{-}CH_2CH_2{-}CH[(CH_2)_2{-}N(CH_3)_2]_2$.

15. The composition according to claim 8 wherein said nitrogen-containing compound is

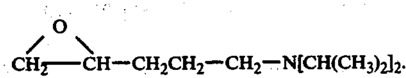

16. The composition according to claim 8 wherein said nitrogen-containing compound is

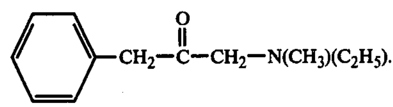

17. The composition according to claim 8 wherein said nitrogen-containing compound is

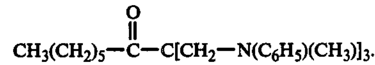

18. The composition according to claim 8 wherein said nitrogen-containing compound is

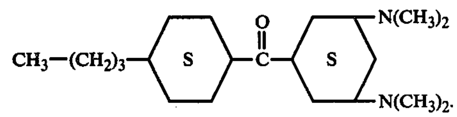

19. The composition according to claim 8 wherein said nitrogen-containing compound is $CH_3N{=}CH{-}CH_2{-}C(CH_3)_2{-}CH_2{-}N(C_4H_9)_2$.

20. The composition according to claim 8 wherein said nitrogen-containing compound is

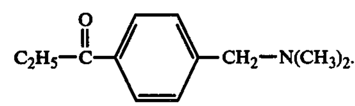

21. The composition according to claim 8 wherein said nitrogen-containing compound is

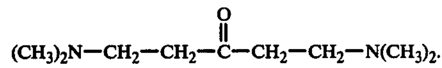

22. The composition of claim 1 wherein said copolymer is selected from copolymers represented by B/A, B/A—A, A-B, and mixtures, wherein B/A represents a randomized block of conjugated diene/monovinylarene, which can be tapered, A represents homopolymeric block of polymerized monovinylarene, and B represents a block of homopolymerized polyconjugated diene.

23. The composition of claim 1 wherein said copolymer contains a random block B/A, and wherein the block polystyrene content is in the range of about 15 to 25 weight percent.

24. The composition of claim 1 wherein said base oil is a lubricating oil having a minimum VI of about 130, wherein said grafted copolymer is employed in an amount of about 0.5 to 5 volume percent relative to the base oil.

25. The composition of claim 1 wherein said base oil is an automotive transmission fluid wherein said grafted copolymer is employed in an amount of about 3 to 5 volume percent.

26. The composition of claim 1 wherein said base oil is an aviation oil wherein said grafted copolymer is employed in an amount of about 8 to 9 volume percent.

27. Nitrogen-containing grafted hydrogenated conjugated diene hydrocarbon/monovinylarene hydrocarbon copolymers having polymerized monovinylarene content of about 20 to 70 weight percent with the proviso that when said copolymer contains a random conjugated diene/monovinylarene block, the block polymonovinylarene content is in the range of about 15 to 35 weight percent, a number average molecular weight of at least about 20,000, the extent of hydrogenation of said copolymer such that about at least 95 weight percent of olefinic double bonds having been saturated, and less than about 5 weight percent of aromatic double bonds having been saturated, said copolymer characterized as having been prepared by the process which comprises metalating a hydrogenated conjugated diene/monovinylarene copolymer, and reacting the resulting metalated hydrogenated copolymer with an effective amount of a nitrogen-containing organic compound represented by the general formulae $X—Q—(NR^3_2)_n$ or $Y[Q—(NR^3_2)_n]_m$ wherein each $R^3$ is the same or different alkyl, cycloalkyl, aryl, or combination radical thereof; Q is a hydrocarbon radical having a valence of n+1 and is a saturated aliphatic, saturated cycloaliphatic, aromatic, or combination radical; X is a functional group capable of reaction on a one-to-one basis with one equivalent of polymer lithium; and Y is or contains a functional group capable of reacting on a one-to-one basis with one equivalent of polymer lithium; n is at least one, and m is 2 or 3, such that the resulting grafted copolymer exhibits a nitrogen content of at least about 0.01 weight percent.

28. The nitrogen-containing grafted copolymers of claim 27 wherein X is $$R^4—\overset{O}{\overset{\|}{C}}—;$$

$N{\equiv}C—$; $R^3N{=}HC—$;

$$R^4_2C\overset{O}{—}CR^4—$$

wherein each $R^4$ is the same or different and is hydrogen, alkyl, cycloalkyl, aryl, or combination radical; and Y is X or contains an X functional group.

29. The nitrogen-containing grafted copolymers of claim 27 wherein the nitrogen content is in the range of about 0.01 to 5 weight percent.

30. A copolymer according to claim 27 wherein the nitrogen-containing grafted copolymer has a number average molecular weight in the range of about 20,000 to 300,000, a vinyl content prior to hydrogenation of about 20 to 95 weight percent, and a nitrogen content of about 0.01 to 5 weight percent.

31. A copolymer according to claim 30 wherein said grafted copolymer has a number average molecular weight in the range of about 25,000 to 100,000, and a vinyl content prior to hydrogenation of about 20 to 70 weight percent.

32. A copolymer according to claim 27 wherein said nitrogen-containing compound is selected from the group consisting of

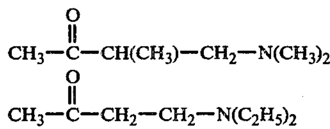

-continued

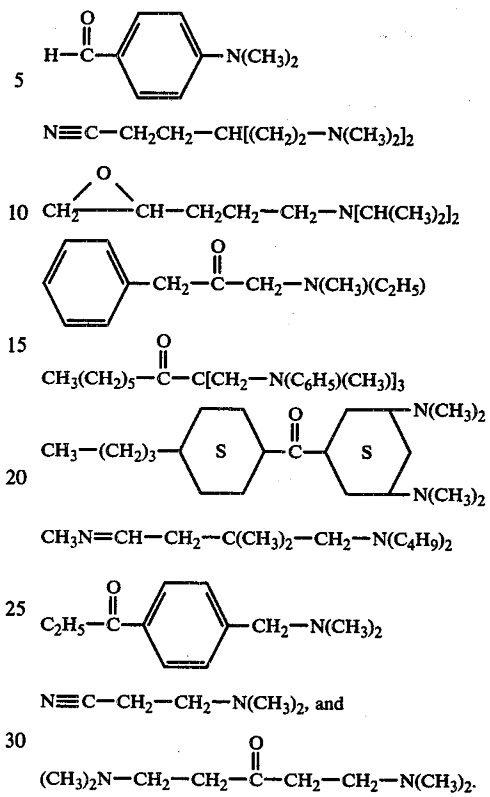

33. A copolymer according to claim 32 wherein said copolymer is a copolymer of butadiene and styrene, isoprene and styrene, butadiene and α-methylstyrene, or isoprene and α-methylstyrene.

34. The copolymer according to claim 33 wherein said hydrogenated butadiene-styrene block copolymer is a 41/59 weight percent hydrogenated butadiene/styrene block copolymer having a block styrene content of about 20 weight percent, and said nitrogen-containing compound is 4-dimethylamino-3-methyl-2-butanone.

35. The copolymer according to claim 34 wherein said nitrogen-containing compound is 4-dimethylamino-3-methyl-2-butanone.

36. The copolymer according to claim 33 wherein said nitrogen-containing compound is p-dimethylaminobenzaldehyde.

37. The copolymer according to claim 33 wherein said nitrogen-containing compound is 3-dimethylaminoproprionitrile.

38. The copolymer according to claim 33 wherein said nitrogen-containing compound is 4-diethylamino-2-butanone.

39. The copolymer according to claim 33 wherein said nitrogen-containing compound is $N{\equiv}C—CH_2CH_2—CH[(CH_2)_2—N(CH_3)_2]_2$.

40. The copolymer according to claim 33 wherein said nitrogen-containing compound is

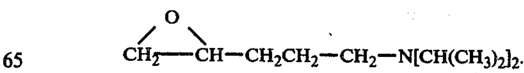

41. The copolymer according to claim 33 wherein said nitrogen-containing compound is

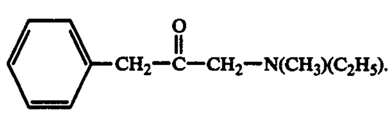

42. The copolymer according to claim 33 wherein said nitrogen-containing compound is $$CH_3(CH_2)_5-\overset{O}{\overset{\|}{C}}-C[CH_2-N(C_6H_5)(CH_3)]_3.$$

43. The copolymer according to claim 33 wherein said nitrogen-containing compound is

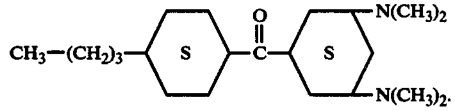

44. The copolymer according to claim 33 wherein said nitrogen-containing compound is $CH_3N{=}CH-CH_2-C(CH_3)_2-CH_2-N(C_4H_9)_2$.

45. The copolymer according to claim 33 wherein said nitrogen-containing compound is

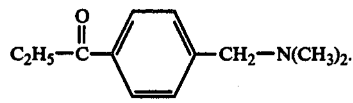

46. The copolymer according to claim 33 wherein said nitrogen-containing compound is

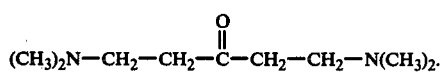

47. The copolymer of claim 27 wherein said copolymer is selected from copolymers represented by B/A, B/A—A, A-B, and mixtures, wherein B/A represents a randomized block of conjugated diene/monovinylarene, which can be tapered, A represents homopolymeric block of polymerized monovinylarene, and B represents a block of homopolymerized polyconjugated diene.

48. The copolymer of claim 47 wherein said copolymer contains a random block B/A, and wherein the block polystyrene content is in the range of about 15 to 25 weight percent.

49. The compositions according to claim 1 wherein said $X\text{-}Q\text{-}(NR_2^3)_n$ or $Y[Q\text{-}(NR_2^3)_n]_m$ is said $X\text{-}Q\text{-}(NR_2^3)_n$.

50. The compositions according to claim 1 wherein said grafted copolymer is subjected to a recovery step.

51. The copolymers according to claim 27 wherein said $X\text{-}Q\text{-}(NR_2^3)_n$ or $Y[Q\text{-}(NR_2^3)_n]_m$ is said $X\text{-}Q\text{-}(NR_2^3)_n$.

52. The copolymers according to claim 27 further employing a copolymer recovery step.

* * * * *